(12) United States Patent
Ikki

(10) Patent No.: US 10,459,816 B2
(45) Date of Patent: Oct. 29, 2019

(54) COMMUNICATION SETTING NOTIFICATION APPARATUS

(71) Applicant: FANUC CORPORATION, Minamitsuru-gun, Yamanashi (JP)

(72) Inventor: Takeshi Ikki, Yamanashi (JP)

(73) Assignee: Fanuc Corporation, Yamanashi (JP)

(\*) Notice: Subject to any disclaimer, the term of this patent is extended or adjusted under 35 U.S.C. 154(b) by 163 days.

(21) Appl. No.: 15/415,168

(22) Filed: Jan. 25, 2017

(65) Prior Publication Data
US 2017/0212821 A1     Jul. 27, 2017

(30) Foreign Application Priority Data

Jan. 26, 2016 (JP) ................. 2016-012402

(51) Int. Cl.
| | |
|---|---|
| *H04L 12/28* | (2006.01) |
| *H04L 29/08* | (2006.01) |
| *G06F 11/32* | (2006.01) |
| *G06F 11/30* | (2006.01) |
| *G06F 13/364* | (2006.01) |

(Continued)

(52) U.S. Cl.
CPC .......... *G06F 11/327* (2013.01); *G06F 11/221* (2013.01); *G06F 11/3027* (2013.01); *G06F 11/3041* (2013.01); *G06F 11/3051* (2013.01); *G06F 13/364* (2013.01); *G06F 13/385* (2013.01)

(58) Field of Classification Search
None
See application file for complete search history.

(56) References Cited

U.S. PATENT DOCUMENTS

2009/0037591 A1    2/2009  Sakai
2010/0082837 A1    4/2010  Relander et al.
(Continued)

FOREIGN PATENT DOCUMENTS

| CN | 101360029 A | 2/2009 |
| JP | 2003067272 A | 3/2003 |

(Continued)

OTHER PUBLICATIONS

Decision to Grant a Patent for Japanese Application No. 2016-012402, dated Dec. 20, 2017 with translation, 6 pages.
(Continued)

*Primary Examiner* — Hyun Nam
(74) *Attorney, Agent, or Firm* — RatnerPrestia

(57) ABSTRACT

A communication setting notification apparatus may automatically investigate communication setting of I/O data communication of EtherNet/IP compatible with adapter equipment, the apparatus comprising an I/O data confirming unit configured to transmits an I/O data read request message to the adapter equipment and determines a valid instance ID based on an I/O data read response message from the adapter equipment, a communication start testing unit configured to transmits a communication start request message to the adapter equipment and determines valid communication setting based on whether or not I/O data communication can be established with the adapter equipment, and a communication setting notifying unit configured to outputs the valid communication setting.

10 Claims, 3 Drawing Sheets

(51) Int. Cl.
    *G06F 13/38*     (2006.01)
    *G06F 11/22*     (2006.01)

(56) References Cited

U.S. PATENT DOCUMENTS

| | | | |
|---|---|---|---|
| 2012/0203877 A1* | 8/2012 | Bartholomay | H04L 63/0227 709/221 |
| 2014/0280846 A1* | 9/2014 | Gourlay | H04L 41/00 709/223 |
| 2014/0337551 A1 | 11/2014 | Cho | |

FOREIGN PATENT DOCUMENTS

| | | |
|---|---|---|
| JP | 2014119912 A | 6/2014 |
| JP | 2014-222870 | 11/2014 |
| JP | 2015103996 A | 6/2015 |
| JP | 2016005247 A | 1/2016 |

OTHER PUBLICATIONS

Chinese Office Action for Chinese Application No. 20170056196.X, dated Oct. 8, 2018 with English translation, 14 pages.

\* cited by examiner

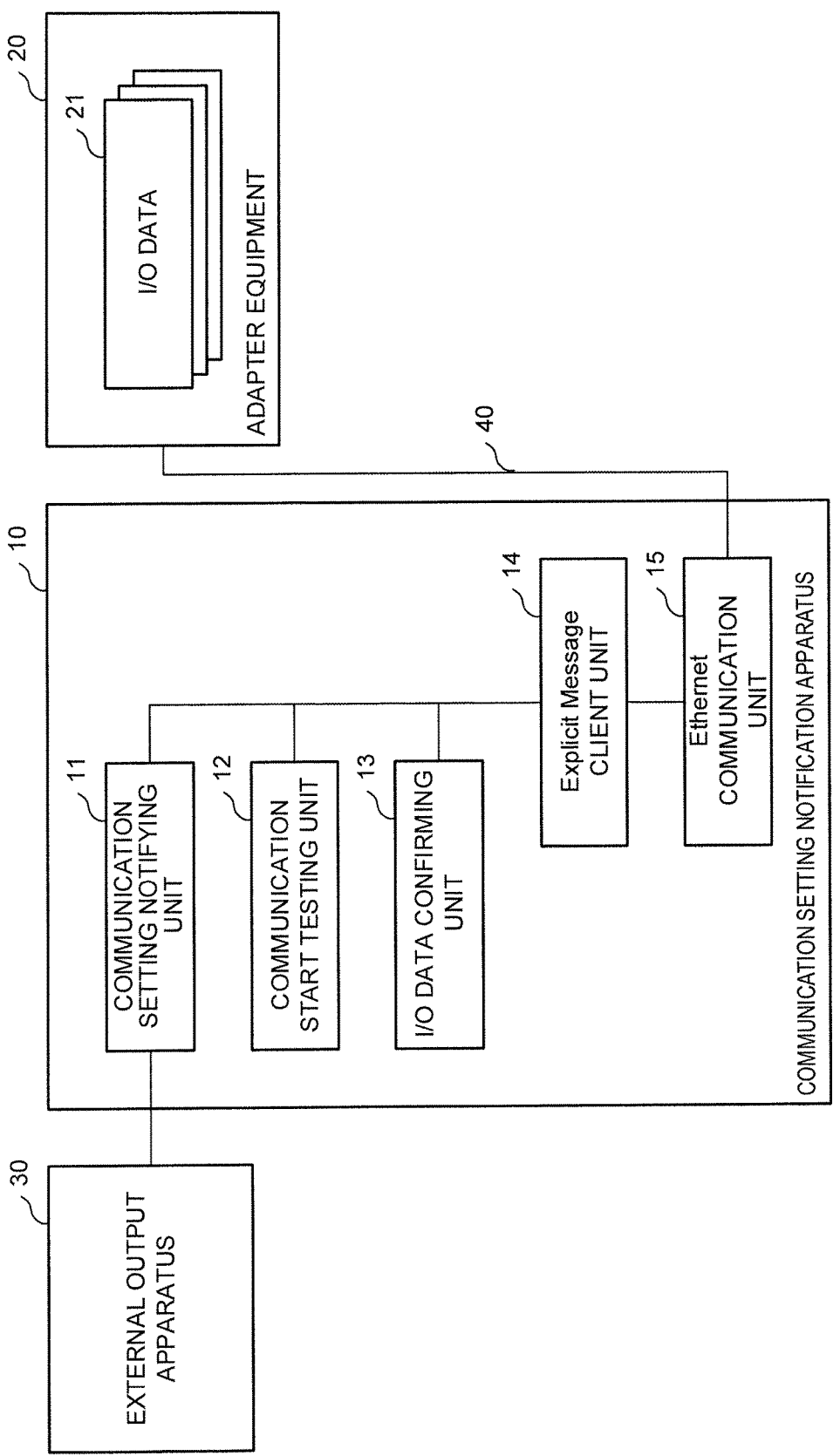

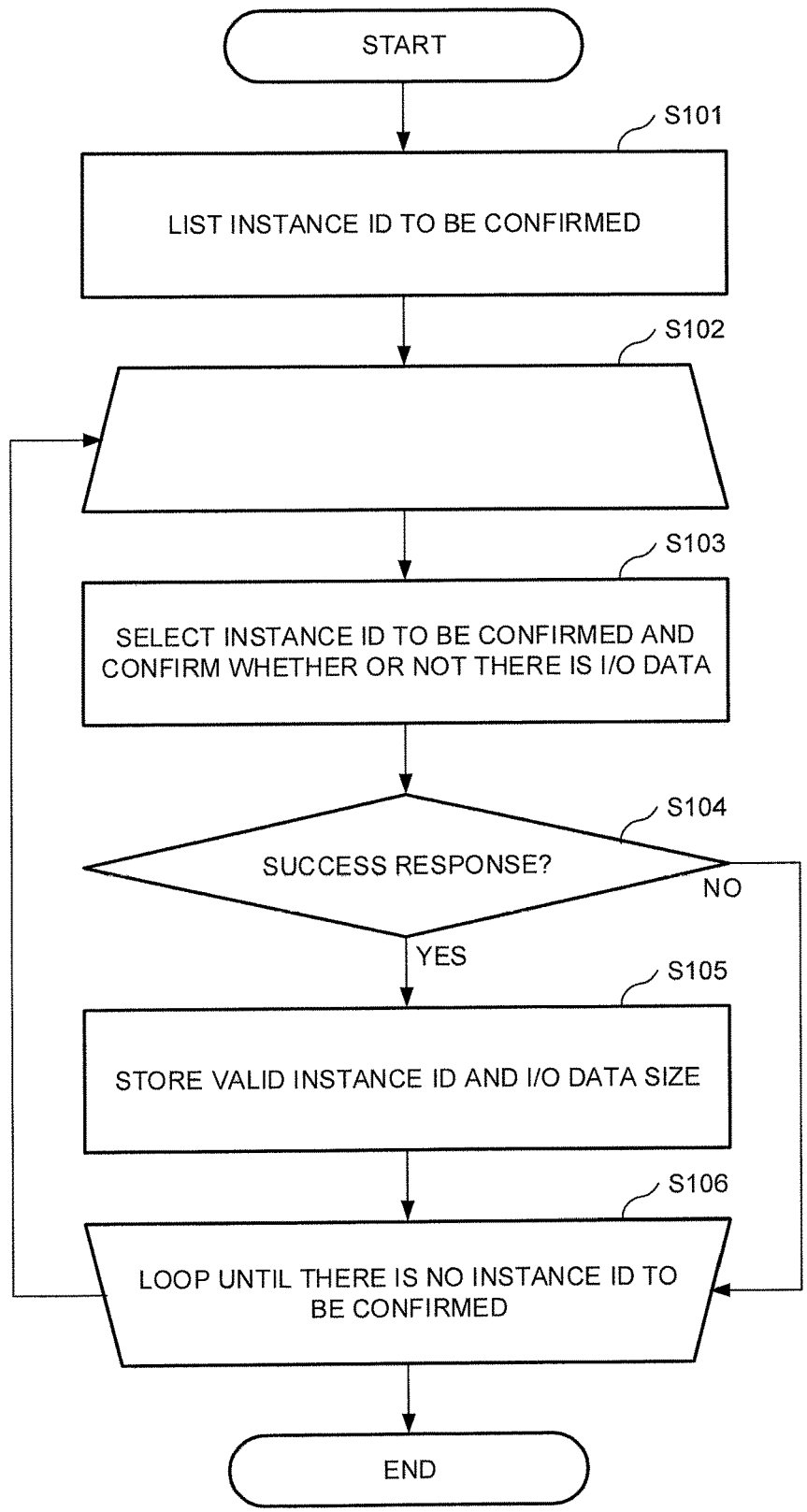

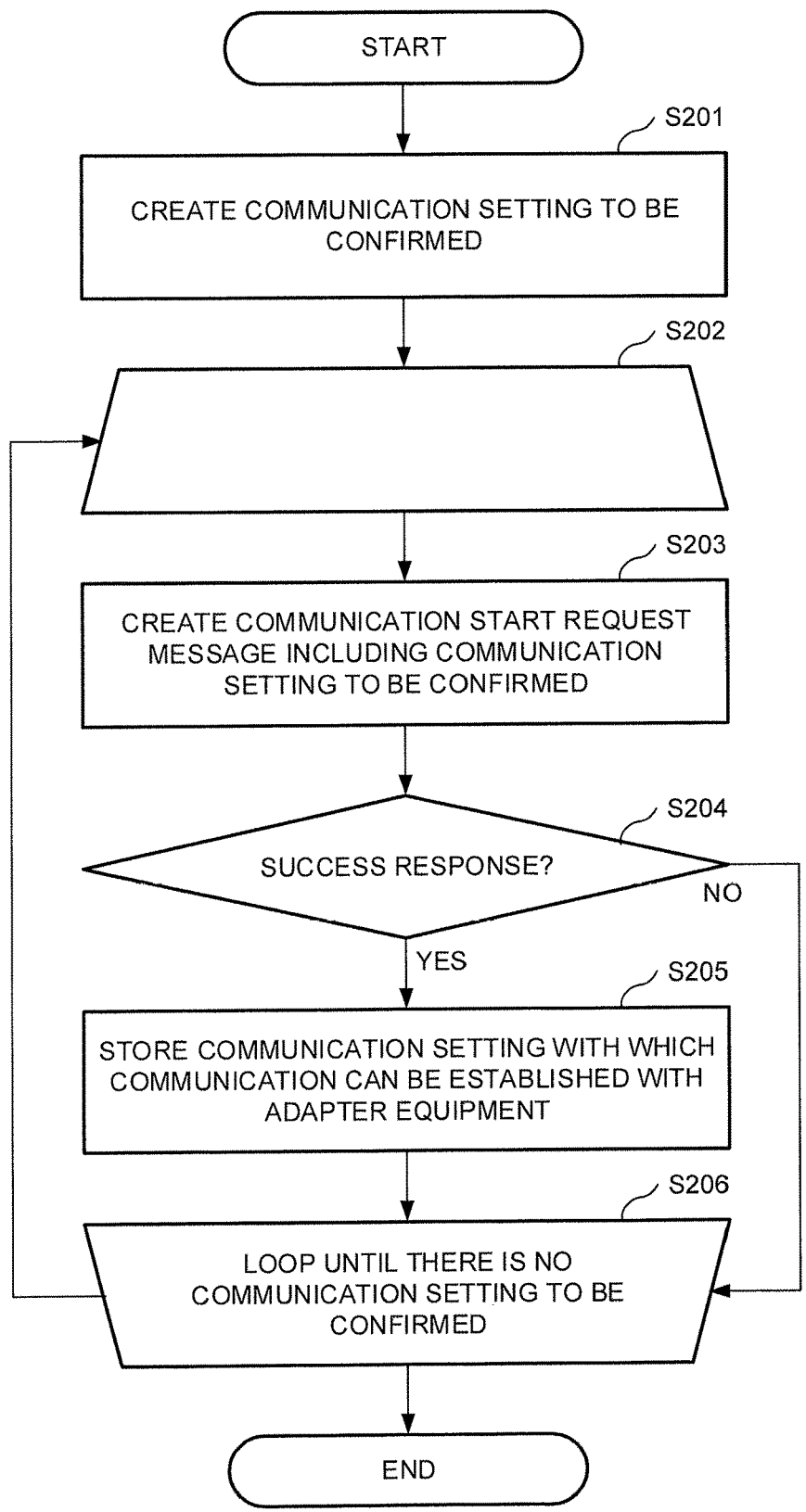

COMMUNICATION SETTING NOTIFICATION APPARATUS

BACKGROUND OF THE INVENTION

1. Field of the Invention

The present invention relates to a communication setting notification apparatus, and more particularly, relates to a technology for investigating and giving notification of a setting value with respect to I/O data communication of EtherNet/IP communication.

2. Description of the Related Art

EtherNet/IP is one of industrial communication protocols using an Ethernet (registered trademark) technology. Typically, a user performs setting of a scanner equipment of EtherNet/IP through the following procedure. (1) Acquire an electronic file (EDS file: Electronic Data Sheets) in which described information relating to communication setting of adapter equipment which becomes a communication partner. (2) Register this EDS file at a setting tool for setting the scanner equipment. (3) The setting tool performs communication setting of the scanner equipment according to the EDS file.

As the related art, Japanese Patent Laid-Open No. 2014-222870 discloses a network setting apparatus which performs communication setting of a slave apparatus (corresponding to the above-described adapter equipment) of PROFIBUS (PROcess FIeld BUS) DP (Decentralized Periphery) which is one of the industrial communication protocols. This network setting apparatus automatically performs communication setting of the slave apparatus based on network configuration information stored in a master apparatus (corresponding to the above-described scanner equipment).

However, with a conventional communication setting method utilizing an EDS file, unless the user acquires an EDS file and performs communication setting using the setting tool, I/O data communication between the scanner equipment and the adapter equipment cannot be tried. Further, in the case where communication setting includes a setting item whose setting value is variable, it is necessary to investigate a current setting value of the adapter equipment in advance and set an appropriate value for the scanner equipment in order to establish I/O data communication between the scanner equipment and the adapter equipment. Due to these problems, conventionally, it takes substantial time to establish I/O data communication of the EtherNet/IP.

SUMMARY OF THE INVENTION

The present invention has been made to solve such problems, and is directed to providing a communication setting notification apparatus which can automatically investigate information relating to communication setting or a setting value of communication partner equipment and give notification of the result.

A communication setting notification apparatus according to one embodiment of the present invention is that automatically investigates communication setting of I/O data communication of EtherNet/IP compatible with adapter equipment including an I/O data confirming unit configured to transmit an I/O data read request message to the adapter equipment and determine a valid instance ID based on an I/O data read response message from the adapter equipment, a communication start testing unit configured to transmit a communication start request message to the adapter equipment and determine valid communication setting based on whether or not I/O data communication can be established with the adapter equipment, and a communication setting notifying unit configured to output the valid communication setting.

In a communication setting notification apparatus according to another embodiment, the I/O data confirming unit is adapted to transmit a plurality of I/O data read request messages including different instance IDs to the adapter equipment, and, in the case where the I/O data read response message from the adapter equipment is a success response, the instance ID included in the I/O data read request message corresponding to the I/O data read response message is determined to be valid.

In a communication setting notification apparatus according to another embodiment, the I/O data confirming unit is adapted to transmit the I/O data read request messages for all the instance IDs within a range defined by specifications.

In a communication setting notification apparatus according to another embodiment, the I/O data confirming unit is adapted to transmit and receive the I/O data read request message and the I/O data read response message as Explicit Message.

In a communication setting notification apparatus according to another embodiment, the communication start testing unit is adapted to transmit a plurality of communication start request messages including the communication setting including combinations of different setting values to the adapter equipment and, when the I/O data communication with the adapter equipment can be established, the communication setting is determined to be valid.

In a communication setting notification apparatus according to another embodiment, the communication start testing unit is adapted to transmit the communication start request messages for all combinations of the setting values.

In a communication setting notification apparatus according to another embodiment, the communication start testing unit is adapted to transmit and receive the communication start request message as Explicit Message.

In a communication setting notification apparatus according to another embodiment, the communication setting notifying unit is adapted to output the valid communication setting to a monitor.

In a communication setting notification apparatus according to another embodiment, the communication setting notifying unit is adapted to output the valid communication setting to an external recording medium.

In a communication setting notification apparatus according to another embodiment, the communication setting notifying unit is adapted to output a file including the valid communication setting.

According to the present invention, it is possible to provide a communication setting notification apparatus which can automatically investigate information relating to communication setting and a setting value of communication partner equipment and give notification of the result.

BRIEF DESCRIPTION OF THE DRAWINGS

The above-described and other objects and characteristics of the present invention will be apparent from the following description of embodiments with reference to the accompanying drawings, wherein:

FIG. 1 is a block diagram illustrating a configuration of a communication setting notification apparatus;

FIG. 2 is a flowchart illustrating operation of the communication setting notification apparatus; and FIG. 3 is a flowchart illustrating operation of the communication setting notification apparatus.

DETAILED DESCRIPTION OF THE PREFERRED EMBODIMENTS

First, an outline of operation of a communication setting notification apparatus 10 according to an embodiment of the present invention will be described. In EtherNet/IP, other than I/O data communication, message communication referred to as Explicit Message can be performed. By using this message communication, it is possible to acquire various kinds of information supported by EtherNet/IP equipment.

Therefore, the communication setting notification apparatus 10 first designates an instance ID indicating an identifier of I/O data among items of communication setting and inquires adapter equipment through message communication. The communication setting notification apparatus 10 makes an inquiry using all instance IDs within a range determined by specifications. Accordingly, it is possible to acquire at least one instance ID supported by the adapter equipment and the I/O data size corresponding to the each instance ID.

The communication setting notification apparatus 10 then creates communication setting including the instance ID and the I/O data size acquired through the above-described procedure as well as a set value on each item. In this case, there is a possibility that the set value of the item to be set sometimes may differ in each adapter equipment. In order to address such issue, the communication setting notification apparatus 10 is adapted to create possible communication setting in a round-robin manner using all possible set values of the item.

The communication setting notification apparatus 10 repeatedly requests communication start to the adapter equipment sequentially using the created communication setting. During this process, if a success response is returned from the adapter equipment in response to a request of communication start which is made using certain communication setting, it can be judged that the adapter equipment supports the communication setting.

Finally, the communication setting notification apparatus 10 notifies a user of the communication setting supported by the adapter equipment.

An arrangement of the communication setting notification apparatus 10 will now be described with reference to a block diagram in FIG. 1. The communication setting notification apparatus 10 includes a communication setting notifying unit 11, a communication start testing unit 12, an I/O data confirming unit 13, an Explicit Message client unit 14 and an Ethernet communication unit 15.

The Ethernet communication unit 15 performs Ethernet communication with adapter equipment 20 via a communication line 40.

The Explicit Message client unit 14 is adapted to perform message communication with the adapter equipment 20.

The I/O data confirming unit 13 is adapted to acquire information relating to I/O data 21 from the adapter equipment 20 via the Explicit Message client unit 14.

The communication start testing unit 12 creates a plurality of types of communication setting based on the information acquired by the I/O data confirming unit 13, or the like. Further, the communication start testing unit 12 tries to establish the I/O data communication with the adapter equipment 20 via the Explicit Message client unit 14.

The communication setting notifying unit 11 outputs valid communication setting data to an external output apparatus 30 (such as, for example, a monitor and a memory card) to thereby notify the user of the communication setting data.

Note that a typical communication setting notification apparatus 10 is scanner equipment itself, or it may be an information processing apparatus other than the scanner equipment, such as a personal computer and a numerical control apparatus. Generally, the communication setting notification apparatus 10 includes a processor, a storage and an input/output devices. The processor logically develops the above-described respective processing units 11 to 15 by reading out and executing a program stored in the storage to control the input/output devices.

The operation of the communication setting notification apparatus 10 will now be described in detail with reference to flowcharts in FIG. 2 and FIG. 3. The communication setting notification apparatus 10 operates through the following procedure including three stages. (1) Acquire at least one instance ID and I/O data size pair of the adapter equipment. (2) Send a communication start request to the adapter equipment and confirm a value of communication setting. (3) Notify the user of correct communication setting.

(1) The Stage for Acquiring Instance ID and I/O Data Size of Adapter Equipment

The I/O data confirming unit 13 creates an I/O data read request message and transmits this message to the adapter equipment 20 via the Explicit Message client unit 14 and the Ethernet communication unit 15 (step S103). The instance ID is an identifier for designating which I/O data held by the adapter equipment 20 is to be read out.

When the adapter equipment 20 receives the I/O data read request message, the adapter equipment 20 confirms whether or not there is I/O data 21 having the designated instance ID. If there is I/O data 21 having the designated instance ID, the adapter equipment 20 returns a success response to the communication setting notification apparatus 10. The success response includes information indicating a size of the I/O data 21. On the other hand, if there is no I/O data 21 having the designated instance ID, the adapter equipment 20 returns a failure response.

When the Ethernet communication unit 15 receives an I/O data read response message from the adapter equipment 20, the Ethernet communication unit 15 notifies the I/O data confirming unit 13 via the Explicit Message client unit 14 (step S104). In the case where the received message is a failure response, the I/O data confirming unit 13 discards the I/O data read response message. On the other hand, in the case where the received message is a success response, the Ethernet communication unit 15 temporarily stores the instance ID designated in the I/O data read request message as well as a size of the I/O data 21 included in the I/O data read response message as a pair (step S105).

The I/O data confirming unit 13 repeats the process for transmitting the I/O data read request message with changing the value of the instance ID (steps S106, S102). A range of possible values of the instance ID is defined in its specifications. The I/O data confirming unit 13 continues the process for transmitting the I/O data read request message until all the instance IDs within the range defined in its specifications are covered, that is, until there is no instance ID about which an inquiry is to be made. Note that the range of the instance ID may be determined through designation by the user, or the like.

(2) The Stage for Sending Communication Start Request to Adapter Equipment and Confirm Value of Communication Setting The communication start testing unit 12 creates a communication start request message including communication setting in which various kinds of setting values are designated (step S201). The communication setting includes a number of setting items other than the instance ID and the size of the I/O data 21 acquired in the above-described stage (1). Among them, in some setting items including the instance ID and the I/O data size, there is a possibility that setting values differ for each adapter equipment 20. For such setting items, possible setting values are used in a round-robin manner and all combination patterns of the setting values are covered and a plurality of communication start request messages are created.

In the communication start request message, for example, it is possible to designate the value of acquired instance ID and I/O data size to be set on input data and/or output data. Further, as a communication type, it is possible to designate one of multicast communication in which I/O data are simultaneously transmitted to a plurality of adapter equipment 20 and single-cast communication in which transmission is performed individually.

The communication start testing unit 12 creates a plurality of communication start request messages so that all the combinations of possible options in such setting items are covered. Note that, concerning a setting item for which it is not necessary to take into account a plurality of options, an appropriate setting value can be set as a fixed value. Alternatively, it is also possible to allow the user to designate an appropriate setting value.

The communication start testing unit 12 transmits the created messages to the adapter equipment 20 via the Explicit Message client unit 14 and the Ethernet communication unit 15 (step S203). Upon received the communication start request message, the adapter equipment 20 confirms whether I/O data communication can be established through communication setting designated in the message. If the communication can be established, the adapter equipment 20 returns a success response to the communication setting notification apparatus 10. On the other hand, if the communication cannot be established, the adapter equipment 20 returns a failure response to the communication setting notification apparatus 10.

Upon received the communication start response message from the adapter equipment 20, the Ethernet communication unit 15 notifies the communication start testing unit 12 via the Explicit Message client unit 14 (step S204). If the received message is a failure response, the communication start testing unit 12 discards the communication start response message. On the other hand, if the received message is a success response, the communication start testing unit 12 temporarily stores communication setting designated in the communication start request message (step S205), because communication can be established with the adapter equipment 20 using this communication setting. In the case of the success response, further, a communication completion request message is issued, and established I/O data communication is completed. The communication start testing unit 12 repeats the process for transmitting the communication start request message to the adapter equipment 20 until all the communication start request messages are transmitted, that is, until all the communication start request messages covering combination patterns of the setting values are transmitted (steps S206, S202).

Note that, normally, the failure response includes a code indicating a cause of the failure. Therefore, there is a case where a group of setting values which causes the failure can be judged by investigating this code. In such a case, in a loop of operation to be effected thereafter, concerning the group of setting values for which it can be judged in advance that communication will be failed, a communication start request message does not have to be created and transmitted.

For example, in the case where an error code indicating an error of an instance ID of input data is returned from the adapter equipment 20, the communication start testing unit 12 can judge that a value designated as the instance ID of the input data among the groups of the setting values is an erroneous one, and a group of setting values in which the same value is used for the instance ID of the input data will be failed in a similar manner. Therefore, the communication start testing unit 12 does not have to create and transmit a communication start request message in which the value same as that of the instance ID designated when the error code is returned.

(3) The Stage for Notifying User of Correct Communication Setting

The communication setting notifying unit 11 outputs communication setting succeed in establishing I/O data communication with the adapter equipment 20 to the external output apparatus 30 to notify it to the user. The external output apparatus 30 is, typically, an output apparatus such as a monitor or a recording medium such as a memory card. Note that, at this time, the communication setting notifying unit 11 may output setting data in a form which can be directly read by the scanner equipment or the setting tool, for example, an EDS file. Further, in the case where there is no communication setting succeed in establishing I/O data communication, or in the case where an abnormality occurs during processing, the communication setting notifying unit 11 can notify the user of error information.

According to the present embodiment, the communication setting notification apparatus 10 can investigate communication setting with which I/O data communication can be established while automatically interacting with actual equipment, that is, the adapter equipment 20. Thus, the user can establish I/O data communication between the adapter equipment and the scanner equipment even when an EDS file is not acquired in advance. It is possible to avoid the conventional cumbersome investigation of communication setting through a trial and error process, so that considerable reduction of man-hours required for creating setting.

While this invention has been described in terms of the preferred embodiments thereof, it is not intended to be so limited, and modifications such as replacement, omission, addition, and replacement of order of components can be made without departing from the scope of the invention.

The invention claimed is:

1. A communication setting notification apparatus which automatically investigates communication setting of I/O data communication of EtherNet/IP compatible with adapter equipment, the communication setting notification apparatus comprising:

an I/O data confirming unit configured to transmit an I/O data read request message to the adapter equipment and determine a valid instance ID based on an I/O data read response message from the adapter equipment;

a communication start testing unit configured to transmit a communication start request message to the adapter equipment and determine valid communication setting based on whether or not I/O data communication can be established with the adapter equipment; and a communication setting notifying unit configured to output the valid communication setting, wherein the I/O data confirming unit transmits a plurality of I/O data read request messages including different instance IDs to the adapter equipment and, wherein when there is I/O data having a designated instance ID of the different instant IDs, the adapter equipment returns a success response to the I/O data read response message, and the instance ID included in the I/O data read request message.

2. The communication setting notification apparatus according to claim 1, wherein the I/O data confirming unit transmits the I/O data read request messages for all the instance IDs within a range defined by specifications.

3. The communication setting notification apparatus according to claim 1, wherein the I/O data confirming unit transmits and receives the I/O data read request message and the I/O data read response message as an Explicit Message.

4. The communication setting notification apparatus according to claim 1, wherein the communication start testing unit transmits a plurality of communication start request messages including the communication setting including combinations of different setting values to the adapter equipment and, when the I/O data communication with the adapter equipment can be established, the communication setting is determined to be valid.

5. The communication setting notification apparatus according to claim 4, wherein the communication start testing unit transmits the communication start request messages for all combinations of the setting values to the adapter equipment.

6. The communication setting notification apparatus according to claim 1, wherein the communication start testing unit transmits and receives the communication start request message as an Explicit Message.

7. The communication setting notification apparatus according to claim 1, wherein the communication setting notifying unit outputs the valid communication setting to a monitor.

8. The communication setting notification apparatus according to claim 1, wherein the communication setting notifying unit outputs the valid communication setting to an external recording medium.

9. The communication setting notification apparatus according to claim 1, wherein the communication setting notifying unit outputs a file including the valid communication setting.

10. The communication setting notification apparatus according to claim 1, wherein the success response includes information including a size of the I/O data.

* * * * *